(12) United States Patent
He et al.

(10) Patent No.: US 11,163,869 B2
(45) Date of Patent: Nov. 2, 2021

(54) IDENTITY AUTHENTICATION WITHOUT ENTRY OF PASSWORD

(71) Applicant: INTERNATIONAL BUSINESS MACHINES CORPORATION, Armonk, NY (US)

(72) Inventors: Xin He, Shanghai (CN); Qu Jiang, Shanghai (CN); Tao Qian, Shanghai (CN); Tan Sheng, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 200 days.

(21) Appl. No.: 15/795,330

(22) Filed: Oct. 27, 2017

(65) Prior Publication Data

US 2019/0130093 A1    May 2, 2019

(51) Int. Cl.
| | | |
|---|---|---|
| G06F 21/40 | (2013.01) | |
| H04L 9/32 | (2006.01) | |
| G06F 21/32 | (2013.01) | |
| G10L 17/24 | (2013.01) | |
| G06F 21/31 | (2013.01) | |

(52) U.S. Cl.
CPC .............. *G06F 21/40* (2013.01); *G06F 21/31* (2013.01); *G06F 21/32* (2013.01); *G10L 17/24* (2013.01); *H04L 9/3226* (2013.01); *H04L 9/3228* (2013.01)

(58) Field of Classification Search
CPC ......... G06F 21/40; G06F 21/32; G10L 17/24; H04L 9/3226; H04L 9/3228
USPC .......................................................... 726/7
See application file for complete search history.

(56) References Cited

U.S. PATENT DOCUMENTS

| | | | |
|---|---|---|---|
| 5,559,961 A | 9/1996 | Blonder | |
| 7,020,774 B1* | 3/2006 | Cornuejols | G06Q 20/00 705/67 |
| 2005/0132192 A1* | 6/2005 | Jeffries | H04L 9/3228 713/169 |
| 2006/0215360 A1 | 9/2006 | Lin et al. | |
| 2007/0250920 A1* | 10/2007 | Lindsay | G07F 7/1025 726/7 |
| 2008/0098464 A1* | 4/2008 | Mizrah | G06F 21/36 726/5 |
| 2013/0144786 A1 | 6/2013 | Tong et al. | |
| 2013/0160098 A1* | 6/2013 | Carlson | H04L 63/0876 726/6 |

(Continued)

FOREIGN PATENT DOCUMENTS

| | | |
|---|---|---|
| CN | 2591188 Y | 12/2003 |
| CN | 101162411 A | 4/2008 |

(Continued)

*Primary Examiner* — Andrew J Steinle
*Assistant Examiner* — Sakinah White Taylor
(74) *Attorney, Agent, or Firm* — John Noh

(57) ABSTRACT

A method, a system and a computer program product are provided for identity authentication. A personal identity information indicative of an identity is received. A plurality of questions, is presented, each of the questions being related to an aspect of features of the password associated with the personal identity information. The A responsive answer is received to the questions including individual answers to the questions. The identity is authenticated in response to determining that the responsive answer is correct.

20 Claims, 3 Drawing Sheets

(56) References Cited

U.S. PATENT DOCUMENTS

| | | | |
|---|---|---|---|
| 2016/0036807 A1* | 2/2016 | Knauss | G06F 21/42 |
| | | | 726/7 |
| 2016/0057110 A1* | 2/2016 | Li | G06F 21/31 |
| | | | 726/7 |
| 2016/0125040 A1* | 5/2016 | Kheterpal | G06Q 20/3827 |
| | | | 707/776 |
| 2016/0378973 A1 | 12/2016 | Melzer | |
| 2018/0189878 A1* | 7/2018 | Uhr | G06Q 40/04 |
| 2018/0262505 A1* | 9/2018 | Ligatti | G06F 21/6281 |
| 2018/0288019 A1* | 10/2018 | Dinia | H04L 63/06 |
| 2019/0386940 A1* | 12/2019 | Hong | H04L 51/02 |

FOREIGN PATENT DOCUMENTS

| | | | | |
|---|---|---|---|---|
| CN | 102035649 A | 4/2011 | | |
| KR | 20120112877 | * 10/2012 | | G06Q 20/02 |
| WO | 2016045498 A1 | 3/2016 | | |

* cited by examiner

IDENTITY AUTHENTICATION WITHOUT ENTRY OF PASSWORD

BACKGROUND

The present invention generally relates to identity authentication, and in particular, to identity authentication using dynamic passcode generated on the basis of an existing password.

With the development of computer technologies and the Internet, people are performing more and more activities with a computer and/or over the Internet. The activities may include banking, shopping, navigating, social networking and so on, and typically may involve accessing to a resource such as a system, a device, a service like banking service, an application such as a social media application, a file, a webpage and the like. To access the resource, a user is often required to set up a user account which comprises personal identity information indicative of the identity of the user, among other things. For reason of information security, the user account is often protected by a password established by the user in association with the user account or the personal identity information. The password and the associated personal identity information are stored in the user's profile locally in the user's device and/or remotely in a resource provider's system. When the user is to access the resource, he/she needs to input the personal identity information to indicate his/her identity. In addition, the user needs to enter the password for identity authentication. If the device and/or the system determines that the password entered is the same as the password stored in association with the personal identity information, the identity is authenticated.

Manually entering a password is susceptible to security threat, because the password might be peeped by another person or captured by a camera, and might be intercepted by a malware on an untrusted device and/or in an unsecure network environment. Although there have been some techniques designed for the protection of password entry, such as physical shield, dynamic soft keyboard and the like, they still cannot completely avoid the security threat.

SUMMARY OF THE INVENTION

In this disclosure, it is proposed a method, a system and a computer program product for identity authentication without requiring manually inputting an existing password.

According to one embodiment of the present invention, there is provided a computer-implemented method. The method comprises receiving personal identity information indicative of an identity. The method further comprises presenting a plurality of questions, each of the questions being related to an aspect of features of the password associated with the personal identity information. The method further comprises receiving a responsive answer to the questions including individual answers to the questions. And the method further comprises authenticating the identity in response to determining that the responsive answer is correct.

According to another embodiment of the present invention, there is provided a system. The system comprises one or more processors, a memory coupled to at least one of the one or more processors, a set of computer program instructions stored in the memory and executed by at least one of the one or more processors in order to perform actions of receiving personal identity information indicative of an identity; presenting a plurality of questions, each of the questions being related to an aspect of features of the password associated with the personal identity information; receiving a responsive answer to the questions including individual answers to the questions; and authenticating the identity in response to determining that the responsive answer is correct.

According to another embodiment of the present invention, there is provided a computer program product, the computer program product comprising a computer readable storage medium having program instructions embodied therewith, wherein the program instructions being executable by a device to perform a method for identity authentication. The method comprises receiving personal identity information indicative of an identity. The method further comprises presenting a plurality of questions, each of the questions being related to an aspect of features of the password associated with the personal identity information. The method further comprises receiving a responsive answer to the questions including individual answers to the questions. And the method further comprises authenticating the identity in response to determining that the responsive answer is correct.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
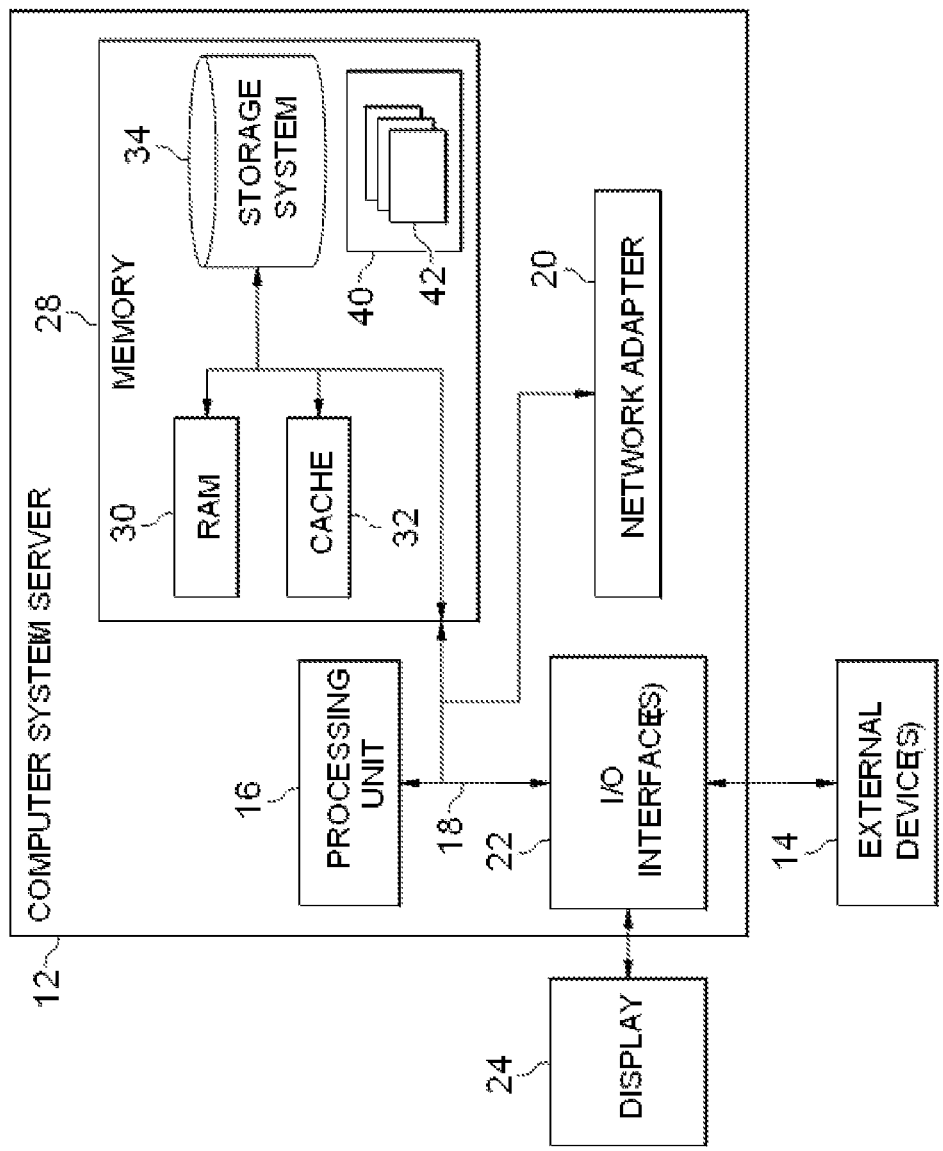
FIG. 1 shows an exemplary computer system which is applicable to implement embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that, although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The method in accordance with embodiments of the present invention may be implemented in a device like computer system/server 12.

To access a resource such as a content, application, or service, a user is often required to set up a user account comprising personal identity information and create a password that is associated with the personal identity information and the user account. The personal identity information and the password are stored in the user's profile. To access the resource, the user needs to provide the personal identity information and input the password for identity authentication, namely, to prove that his identity is consistent with the personal information. However, manually inputting a password is insecure because it might be intercepted by malware or peeped by another person. To address the issue, the general concept of the present invention is to use an existing password for identity authentication, however, without having to entering the password itself. In particularly, it is contemplated that features of the password may be extracted, and questions generated on the basis of the features. The user will be required to answer the questions to prove that he/she knows the password. In other words, the correct answer to the questions will serve as a one-time passcode (OTP). In this way, the user's identity may be authenticated without the risk of the password being peeped or intercepted.

Figure 2:
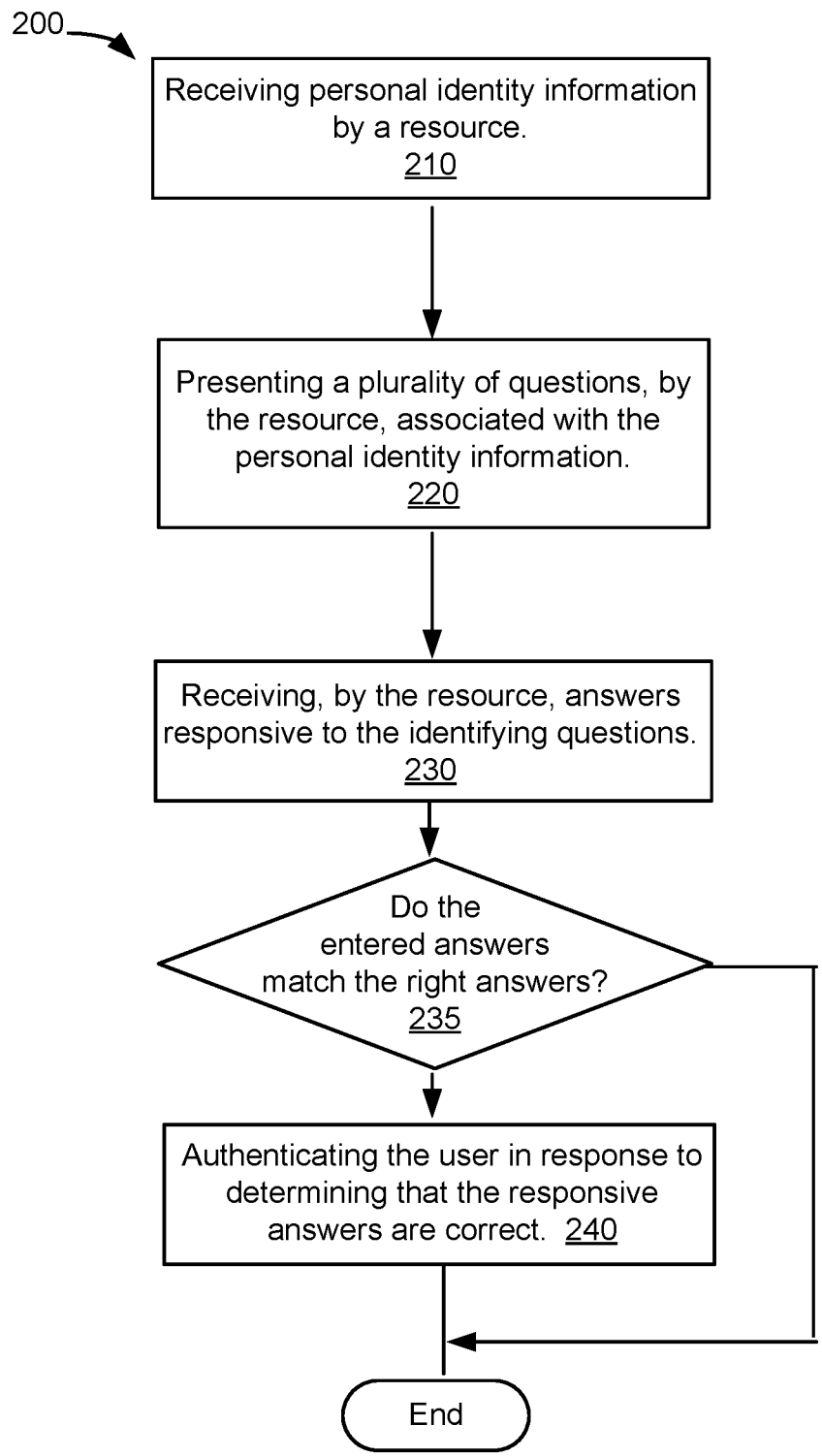
FIG. 2 is a flowchart illustrating a high-level process of a method according to an embodiment of the present invention.

Now refer to FIG. 2, which is a high-level flowchart of a method 200 of verifying personal identity, according to embodiments of the present invention.

As will be easily understood, method 200 may be triggered as a user is logging in for accessing a resource. For example, the user is logging in on a login portal at a client device. The client device may be, for example, a personal computer, an ATM (automatic teller machine), a smartphone and the like. The resource might be content such as a file, a webpage and the like on a device, system website. The resource might also be a service, such as an APP (application) for banking service, shopping service, cloud service and so on.

In Step 210, personal identity information indicative of an identity is received.

As is well known, in the context of the invention, the term "personal identity information" refers to information in connection with, or as a part of, a user account. While requirements for details of the personal identity information may vary depending on different login portals, the personal identity information at least includes a unique identifier to represent the owner of the user account. The identifier might be a designation, a nick name, an email address, a telephone number and the like. The user account is usually set up when the user conducts registration in order to access a resource at later time. The personal identity information is stored in the user's profile in association with a password locally in the user's device and/or remotely, for example, in a database of a resource provider's system. When the user is to access the resource, he/she needs to input the personal identity information to indicate his/her identity.

To facilitate description, assume the personal identity information received in Step 210 is "username_X", which is entered via an input device by a user to designate the user.

According to an embodiment, the personal identity information may be checked by verifying whether there is a user account that is associated with it. If there is not any user account associated with it, the process of method 200 will ends (not shown in FIG. 2). Otherwise, the process proceeds to Step 220.

In Step 220, a plurality of questions is presented, wherein each of the questions is related to an aspect of features of a password that is associated with the personal identity information.

Assume the personal identity information "username_X", received in Step 210, is associated with a password, "ABCabc123" for example, which is stored in connection with the personal identity information as part of the user's profile. Then in Step 220, a plurality of identifying questions is presented to the user. The plurality of identifying questions can be similar to the following questions, discussed in more depth with relation to FIG. 3.

Question 1: Is the length of your password even or odd? Note: The length is counted in terms of characters. Answer "0" for even and "1" for odd.

Question 2: What's the sum of the position values of all vowel letters in your password? Note: The position value is 1 for the first character in your password, 2 for the second and so on. Enter your answer in decimal format.

Question 3: What's the sequence of the last six characters in your password, if any digit is replaced with any one of letter A or E or I or O or U, and any vowel letter is replaced with 0 and any consonant letter is replaced with E?

It may be understood that each of the above three questions relates to an aspect of features of the password "ABCabc123". Specifically, the first question relates to the length of the password. The second question to the total number of the position values of all vowel letters in the password. And the third question 3 relates to, to large extent, the position of digits, vowel letters and consonant letters.

In Step 230, a responsive answer to the questions are received. The responsive answer is a combination of individual answers responded by the user to all of the questions. In the present example, there are three questions. Assuming the answers received are "1", "5" and "OEEEIO", respectively, for the question 1, the question 2 and the question 3, then the responsive answer may be represented by a character string of "15OEEEIO".

In Step 240, the identity is authenticated in response to determining that the responsive answer is correct.

In practice, the responsive answer received in Step 230 may be compared with right answers for corresponding questions. If the responsive answer match with the right answers, then it is determined that the responsive answer is correct, and thus the identity is authenticated.

In the present example, the right answer for the question 1 is "1", because the length of the password "ABCabc123" is 9(nine) which is odd represented by "1". For the question 2 is "5", there are two vowel letters, "A" and "a", in the password. And the position value of the letter "A" is 1 because it is at position No. 1. Similarly, the position value of the letter "a" is 4 because it's at position No. 4. So, the sum of the two position values is 5 (1+4=5). Therefore, the right answer for the question 2 is "5".

For the question 3, "OEEEIO" is one right answer. This is because the last six characters "abc123" of the password may be mapped to "OEEEIO" if "a" is replaced with "0" (vowel letter →"0"), "b" with "E" (consonant letter →"E"), "c" with "E" (consonant letter →"E"), "1" with "E" (digit →"E"/"A"/"I"/"O"/"U"), "2" with "I" (digit →"I"/"A"/"E"/ "O"/"U") and "3" with "0" (digit →"O"/"A"/"E"/"I"/"U").

Because the responsive answer represented by the character string "15OEEEIO" matches with the right answers for all the three questions, it is determined that the responsive answer is correct. In response, the identity indicated by the personal identity information is authenticated as required by the login process. Thus, the user will be allowed to proceed with operations at the client device for accessing the resource, for example, conducting transactions at an ATM. It is to be noted that, in the present example, there is more than one answer for the question 3. For example, "OEEAAA" is also a right answer for the question 3. In other words, if the responsive answer were "15OEEAAA", it would also be correct. Those skilled in the art shall appreciate that the question 3 is intentionally designed to be ambiguous, as ambiguousness may increase the difficulty for a malicious person attempting to guess the password.

In the above, the general process of method 200 has been described in connection with a specific example. Next, implementing details and various embodiments will be provided in the following paragraphs.

As previously mentioned, in Step 220, a plurality of questions is presented, wherein each of the questions relates to an aspect of features of the password associated with the personal identity information received in Step 210. According to an embodiment of the invention, at least one of the plurality of questions may be randomly selected from a set of questions generated in response to the password being established in association with the personal identity information.

In the context of the invention, a password is said to be established if the password is created for the first time, or it is a new password changed from an old password, or it is a reset password. In other words, once a user creates, changes or resets a password, a set of such questions may be generated based on the password as the result. The set of questions may be stored in association with the corresponding password and/or personal identity information. Optionally or additionally, the right answers to the set of questions may also be generated and stored. Later, in execution of method 200, any of the questions to be presented may be randomly selected from the set of questions.

Alternatively, or additionally, according to an embodiment, at least one of the plurality of questions to be presented in Step 220 may be dynamically generated after the personal identity information is received. In other words, after the personal identity information is received, the password associated with the personal identity information may be retrieved and the plurality of questions may be generated for presentation. Advantageously, the right answers may also be generated, though it is not necessary.

No matter the timing of the generation of the questions, the principle for question generation is the same. In implementing embodiments of the present invention, the concept of one-way functions may be employed in generating the questions. As is well known to those skilled in the art, in general computer science, a one-way function is a function that is easy to compute for every input, but hard to invert given a random input. In practice, such one-way functions may be designed to characterize a password, or to extract certain features/characteristics from a password. The features will then be embodied in questions for identity authentication according to the present invention. It shall be appreciated that if one knows a password, he/she should also know the characteristics and thus can answer the questions correctly. And if one can answer the questions correctly, then it may be safely presumed, for a large probability, that the one should also know the password.

In implementing embodiments of the invention, the choice and use of one-way functions may depend on practical situation. Generally, suitable one-way functions have one or more of the following characteristics:

1. Ambiguous enough as the clue for brutal-force cracking. For example, "what's the first character in your password" tends to give too much information. In comparison, "is the first character in your password a digit or not" is more ambiguous.

2. Clear enough to reduce false positive. For example, answering "what's the length of your password" can depend on luck.

3. Easy enough to calculate in the mind without the aid of tools. For example, "what's the MD5 signature of your password" won't work because it's too complicated to answer for the owner of the password.

4. Independent and only relying on information of the password. Otherwise, the question will become a "safety question" easy for resolving by social engineering.

According to an embodiment of the invention, a user interface may be provided on a screen of the client device for presenting the plurality of questions in Step 220. In other words, in Step 220, the plurality of questions may be displayed in the user interface.

Figure 3:
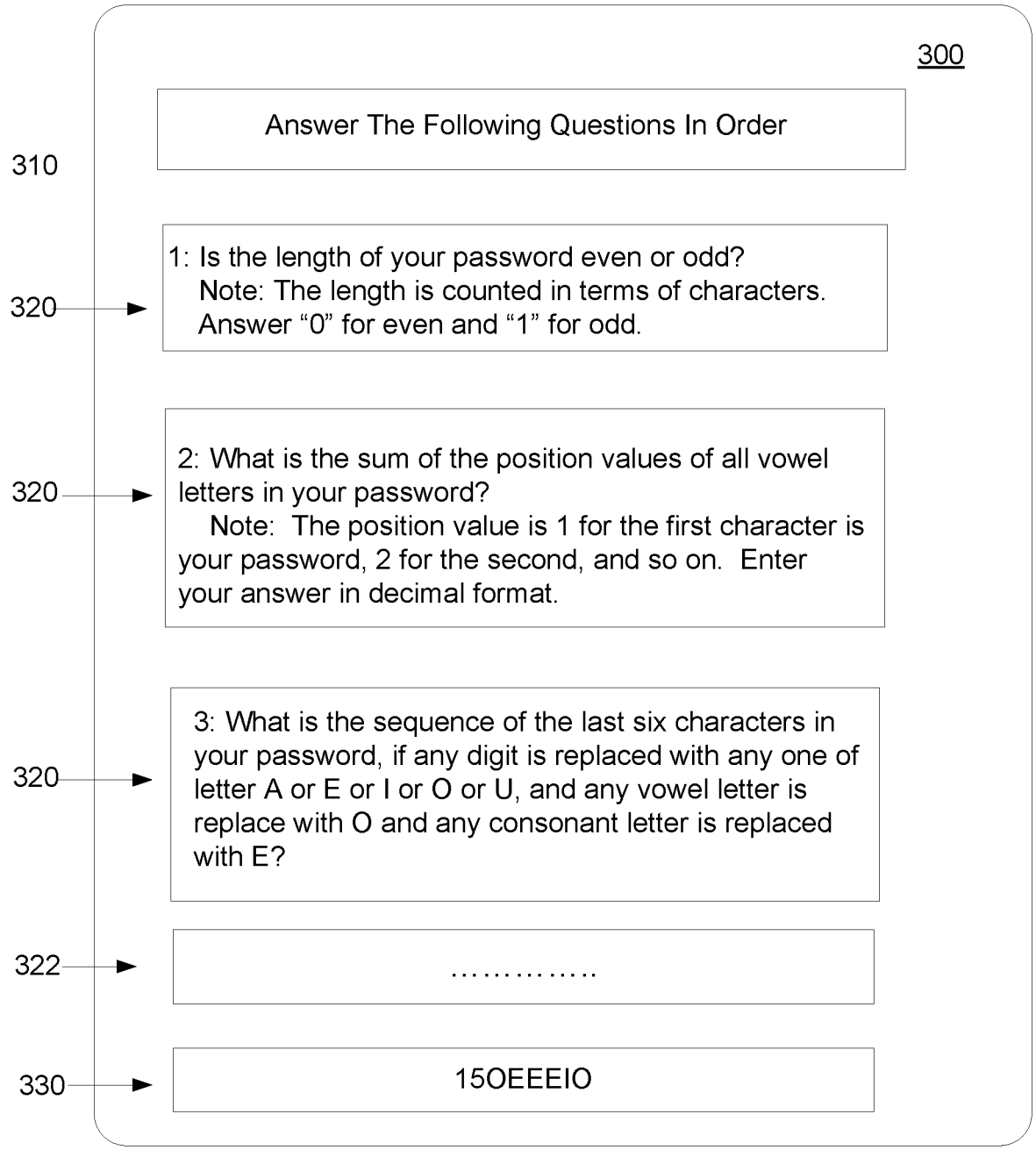
FIG. 3 shows an example user interface for illustrating the method according to an embodiment of the invention.

Refer to FIG. 3, which shows an example user interface (UI) 300 for illustrating the method according to an embodiment of the invention. The UI may be provided on a screen of a client device for presenting the questions in Step 220.

As shown in FIG. 3, in UI 300 there is provided an area 310 which containing a message "Answer the following question in order". There are also provided one or more areas 320, in which one or more questions may be displayed. Specifically, FIG. 3 shows three questions:

1: Is the length of your password even or odd? Note: the length is counted in terms of characters. Answer "0" for even and "1" for odd.

2: What's the sum of the position values of all vowel letters in your password? Note: The position value of the first character in your password as 1, the second as 2, and so on. The answer should be in decimal format.

3: What's the sequence of the last six characters in your password, if any digit is replaced with any one of letter A or E or I or O or U, and any vowel letter is replaced with 0 and any consonant letter is replaced with E?

The reference number 322 denotes that one or more questions (not shown) may be displayed in addition to the questions already displayed in area 320, simultaneously or subsequently.

In UI 300, there is shown one input field 330 for entering the responsive answer to the questions. As shown, for the instant example, the responsive answer entered in input filed 330 by the user is a string of characters "15OEEEIO".

FIG. 3 shows that, in UI 300, there may be provided one or more input fields for entering the responsive answer respectively corresponding to the questions.

Although only one input field 330 is shown in FIG. 3, it shall be appreciated that two or more input fields may be provided in UI 300 for entering answers to corresponding questions respectively. Collectively, these answers constitute the responsive answer.

It is to be noted that, although there are shown three questions in UI 300, the questions may also be displayed one by one, together with an input field for each single question.

It is also to be noted that UI 300 may contain additional area(s) for displaying information and/or additional field(s) for entering information. For example, the personal identity information received in Step 310 may be entered by the use in a field (not shown) in UI 300.

According to an embodiment of the invention, said receiving the responsive answer to the questions in Step 230 may comprise recognizing speech from a voice input device and converting the speech into the responsive answer. In other words, the user may respond to the question with speech via a voice output device, such as microphone, in the client device or connected to the client device. By speech-to-text conversion operations utilizing existing voice-recognition technologies, the answer in the speech may be recognized and converted to a text message in a format as required for representing the answer, such as a string of characters.

As an alternative to the user interface such as UI 300, according to an embodiment of the invention, in Step 220, the questions may also be presented utilizing a voice output device. Those skilled in the art shall appreciate that, given a question in text, existing text-to-speech conversion technologies may be utilized to convert the question to voice message for output via a voice output device, such as speaker, in or connected with the client device.

As is well known, a password is also often established by the user in association with the user account for purpose of data security and identity authentication. Thus, the password is also associated with the personal identity information, and may also be stored with its associated personal identity information in the user's profile locally in the user's device and/or remotely by the resource provider.

Embodiments of method for identity authentication in accordance with the inventions have been described. From the description, it shall be understood that the invention may provide an option to secure identity authentication by answering password related questions instead of entering a password. With the aid of existing technologies, the questions can be designed to be simple to generate and easy to answer by password owners, but ambiguous for a third party to figure out the original password. Because the questions may vary from time to time, the answer to the questions may serve as one-time password, and the number of questions may vary flexibly depending on situations reducing the possibility of successful guessing or brutal-force cracking.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
receiving, by a computer, a request to access a resource of a resource provider, wherein the request includes personal identity information indicative of an identity, comprising a unique userid and a password, the password being created prior to the request being received, the password including a plurality of characters;
receiving, by the resource provider, in order of their presentation, a responsive answer to each of a plurality of questions, each of the questions being generated based on a characteristic of one or more of the characters of the password, and wherein at least one of the questions has a plurality of correct answers;
generating, by the resource provider, a string comprising the responsive answers to the plurality of questions ordered according to the presentation of the plurality of questions;
in response to receiving the responsive answer to each of the questions, determining by the resource provider whether the string matches one of a plurality of combination strings based on stored answers to each of the questions;
permitting access to the requested resource, based on the received personal identity information matching stored personal identity information, and the string matching one of the combination strings; and denying access to the requested resource based on either the received personal identity information not matching the stored personal identity information, or the string not matching any of the combination strings.

2. The method according to claim 1, wherein at least one of the plurality of questions is randomly selected from a set of questions generated and stored based on the characteristic of the password of the personal identity information.

3. The method according to claim 1, wherein at least one of the plurality of questions is not stored and is dynamically generated in response to receiving the personal identity information.

4. The method according to claim 1, wherein said responses to the plurality of questions comprises receiving the responsive answer entered in one or more input fields in a user interface provided on a screen of a client device.

5. The method according to claim 1, wherein said responses to the plurality of questions comprises recognizing speech from a voice input device and converting the speech into the responsive answer.

6. The method according to claim 1, wherein the plurality of questions is generated by utilizing a one-way function, wherein the one-way function has one or more characteristic, comprising: 1) ambiguity; 2) reduction of false positives; and 3) independent of information other than the password.

7. The method of claim 1, wherein access to the requested resource is permitted, based on all the responsive answers matching the stored answers, and without the password.

8. A system comprising:
one or more processors;
a memory coupled to at least one of the one or more processors;
a set of computer program instructions stored in the memory and executed by at least one of the one or more processors in order to perform actions, the actions comprising:
receiving, by a computer, a request to access a resource of a resource provider, wherein the request includes personal identity information indicative of an identity, comprising a unique userid and a password, the password being created prior to the request being received, the password including a plurality of characters;
receiving, by the resource provider, in order of their presentation, a responsive answer to each of a plurality of questions, each of the questions being generated based on a characteristic of one or more of the characters of the password, and wherein at least one of the questions has a plurality of correct answers;
generating, by the resource provider, a string comprising the responsive answers to the plurality of questions ordered according to the presentation of the plurality of questions;
in response to receiving the responsive answer to each of the questions, determining by the resource provider whether the string matches one of a plurality of combination strings based on stored answers to each of the questions;
permitting access to the requested resource, based on the received personal identity information matching stored personal identity information, and the string matching one of the combination strings; and
denying access to the requested resource based on either the received personal identity information not matching the stored personal identity information, or the string not matching any of the combination strings.

9. The system according to claim 8, wherein at least one of the plurality of questions is randomly selected from a set of questions generated and stored based on the characteristic of the password of the personal identity information.

10. The system according to claim 8, wherein at least one of the plurality of questions is not stored and is dynamically generated in response to receiving the personal identity information.

11. The system according to claim 8, wherein said responses to said plurality of questions are received in a user interface provided on a screen of a client device.

12. The system according to claim 11, wherein said responses to the plurality of questions comprises receiving the responsive answer entered in one or more input fields in the user interface.

13. The system according to claim 11, wherein said responses to the plurality of questions comprises recognizing speech from a voice input device and converting the speech into the responsive answer.

14. The system according to claim 8, wherein the plurality of questions is generated by utilizing a one-way function, wherein the one-way function has one or more characteristic, comprising: 1) ambiguity; 2) reduction of false positives; and 3) independent of information other than the password.

15. A computer program product, the computer program product comprising a computer readable storage medium having program instructions embodied therewith, wherein the program instructions being executable by a device to perform a method, the method comprising:
receiving, by a computer, a request to access a resource of a resource provider, wherein the request includes personal identity information indicative of an identity, comprising a unique userid and a password, the password being created prior to the request being received, the password including a plurality of characters;
receiving, by the resource provider, in order of their presentation, a responsive answer to each of a plurality of questions, each of the questions being generated based on a characteristic of one or more of the characters of the password, and wherein at least one of the questions has a plurality of correct answers;
generating, by the resource provider, a string comprising the responsive answers to the plurality of questions ordered according to the presentation of the plurality of questions;
in response to receiving the responsive answer to each of the questions, determining by the resource provider whether the string matches one of a plurality of combination strings based on stored answers to each of the questions;
permitting access to the requested resource, based on the received personal identity information matching stored personal identity information, and the string matching one of the combination strings; and
denying access to the requested resource based on either the received personal identity information not matching the stored personal identity information, or the string not matching any of the combination strings.

16. The computer program product according to claim 15, wherein at least one of the plurality of questions is randomly selected from a set of questions generated and stored based on the characteristic of the password of the personal identity information.

17. The computer program product according to claim 15, wherein at least one of the plurality of questions is not stored and is dynamically generated in response to receiving the personal identity information.

18. The computer program product according to claim 15, wherein said responses to said plurality of questions are received in a user interface provided on a screen of a client device.

19. The computer program product according to claim 18, wherein said responses to the plurality of questions comprises receiving the responsive answer entered in one or more input fields in the user interface.

20. The computer program product according to claim 15, wherein the plurality of questions is generated by utilizing a one-way function, wherein the one-way function has one or more characteristic, comprising: 1) ambiguity; 2) reduction of false positives; and 3) independent of information other than the password.

* * * * *